United States Patent [19]
Brock, Jr. et al.

[11] 3,731,568
[45] May 8, 1973

[54] METHOD AND APPARATUS FOR PROCESSING MOLDED BODIES

[75] Inventors: Gregory C. Brock, Jr., Ulysses T. Gambill, both of Granville, Ohio

[73] Assignee: Owens-Corning Fiberglas Corporation, Toledo, Ohio

[22] Filed: Jan. 26, 1971

[21] Appl. No.: 109,873

[52] U.S. Cl. ...................... 83/23, 83/55, 83/104, 83/914, 264/153, 264/157, 425/316
[51] Int. Cl. .......................... B26d 7/06, B26d 7/18
[58] Field of Search ...................... 425/289, 308, 315, 425/316; 264/153, 157; 83/13, 23, 27, 55, 104, 209, 210, 212, 280, 914

[56] References Cited

UNITED STATES PATENTS

2,550,862   5/1951   Reinecker ........................ 83/27
2,786,254   3/1957   Olson ........................ 264/157 X
3,277,522   10/1966  Strauss ........................ 425/308 X
3,240,851   3/1966   Scalora ........................ 264/153
1,741,656   12/1929  Rolker ........................ 425/316

Primary Examiner—Andrew R. Juhasz
Assistant Examiner—James F. Coan
Attorney—Staelin & Overman and Harry O. Ernsberger

[57] ABSTRACT

The disclosure embraces a method of and apparatus for processing a plurality of molded bodies and involves feeding a plurality of connected bodies, such as bodies of mineral fibers and a portable mounting support therefor to a facility arranged to strip or separate the bodies by severing connections joining the bodies and detaching and removing the severed discrete bodies from the mounting support.

21 Claims, 14 Drawing Figures

PATENTED MAY 8 1973 3,731,568

INVENTORS
GREGORY C. BROCK, JR. &
ULYSSES T. GAMBILL
BY Staelin & Overman
ATTORNEYS

METHOD AND APPARATUS FOR PROCESSING MOLDED BODIES

This invention relates to a method of and apparatus for processing molded bodies, tiles or panels and more particularly bodies, tiles or panels of fibrous material of a character especially usable for surfacing ceilings and walls of rooms, the processing involving severing, separating, stripping or detaching a plurality of integrally joined or connected bodies, tiles or panels from one another and from a support or carrier means employed for supporting the material of the bodies, tiles or panels during the molding operation.

Recent developments have been made in producing bodies, tiles or panels of fibers of mineral material, such as glass fibers, wherein a mass of binder-bearing fibers is subjected to pressure to compress the mass of fibers into a multiple section molding die and the binder cured or set resulting in configurating or contouring the compressed mass of fibers into a plurality of integrated or connected substantially rigid fibrous tiles or panels, for example, nine bodies, tiles or panels being formed or molded in a single molding operation.

Support means for the mass of fibers for the molding operation comprises a tray having a frame having a plurality of wires or linear members in crossing relation whereby the configurations of the molded tiles of the molded unit are delineated by the crossing wires or linear members. The tile configurations of the molded unit are partially severed one from another during the molding operation with unsevered regions or connectors joining groups of tiles or bodies, each group of connected tiles being severed from an adjacent group. Thus, at the completion of the molding operation, the tile configurations of a molded unit are supported on the tray or portable support through the medium of the unsevered regions or connecting bridges between adjacent tiles, engaging the crossing wires or linear members.

The present invention embraces a method involving the steps of delivering a tray or support mounting a molded unit comprising a plurality of connected molded body or tile configurations to an aligning station, transferring a tray bearing the connected molded configurations to a stripping or severing station, stripping or severing the connected bodies one from another and from the tray to provide a plurality of discrete bodies or tiles, conveying the discrete bodies or tiles away from the stripping station, and conveying the tray away from the stripping station independently of the discrete bodies or tiles.

Another object of the invention resides in an apparatus for processing a group of connected molded bodies, such as bodies of fibrous material, on a portable support or tray, the apparatus embodying means for feeding the tray and the group of connected bodies to a severing facility at which severing devices engage the regions of bridges connecting the bodies and sever the connecting regions or bridges and thereby separate the several connected bodies into discrete bodies and separate or detach the discrete bodies from the tray.

Another object of the invention resides in an apparatus embodying means for stripping or severing connected bodies comprising a molded unit of bodies through automatic means and conveying the severed discrete bodies away from the severing or stripping device, the apparatus embodying means for conveying the tray or portable support away from the stripping or severing means at the completion of a stripping or severing operation.

Another object of the invention resides in the provision of an apparatus wherein supports or trays, each mounting a plurality of connected molded bodies of fibers are successively advanced to a stripping station and the trays or supports locked in a position at said station at which stripping instrumentalities separate or sever the regions connecting the several bodies and the stripped discrete bodies removed or detached from the supports or trays, the apparatus including a means for conveying the trays away from the region of the stripping instrumentalities and a second means for collecting the discrete bodies removed or detached from the trays.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

The method and apparatus of the invention are especially adapted for stripping or severing regions joining a plurality of molded fibrous bodies of a molded unit while the unit is mounted on a tray or portable carrier as delivered from a molding apparatus in order to subdivide the molded unit into discrete bodies and to separate or detach the bodies from the tray or support. It is to be understood that the method and apparatus may be employed for severing or stripping other types or shapes of bodies of other severable materials from one another and separating or detaching the bodies from a support or carrier.

The illustrated embodiment of the apparatus is of a character especially adapted for severing regions connecting or joining a plurality of identically shaped fibrous bodies comprising a molded unit and for stripping the discrete bodies from the supporting members of a portable tray or carrier mounting the molded unit.

Referring first to FIGS. 1 through 5, there is illustrated a portable tray or carrier 10 which provides support or support means for movable material such as a mass of fibers, for example, glass fibers, impregnated with a curable or settable binder such as phenolformaldehyde or other suitable resin. The moldable material, while mounted on the tray 10, is subjected to pressure of molding dies, compressing and configurating the material to a form or molded unit 12 comprising a plurality of similarly shaped substantially rigid bodies, tiles or panels of comparatively high density in connected relation, and the binder set or cured. The molding operation forms no part of the present invention.

Figure 1:
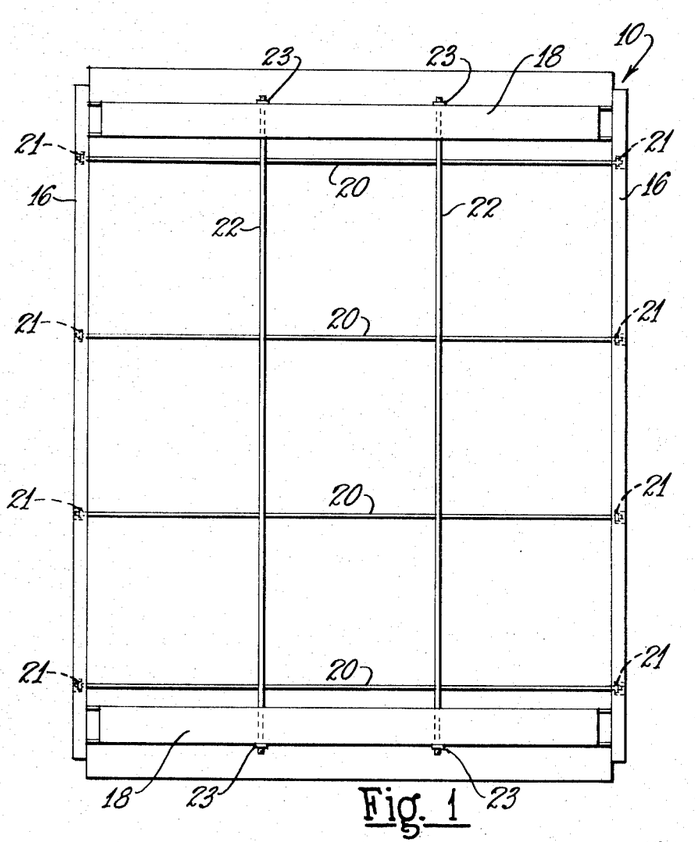
FIG. 1 is a plan view of a carrier or tray for supporting the group of molded bodies in connected relation.
Figure 2:
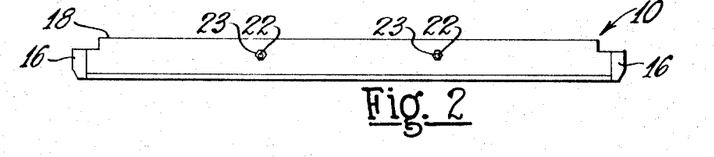
FIG. 2 is an end view of the construction shown in FIG. 1.
Figure 3:
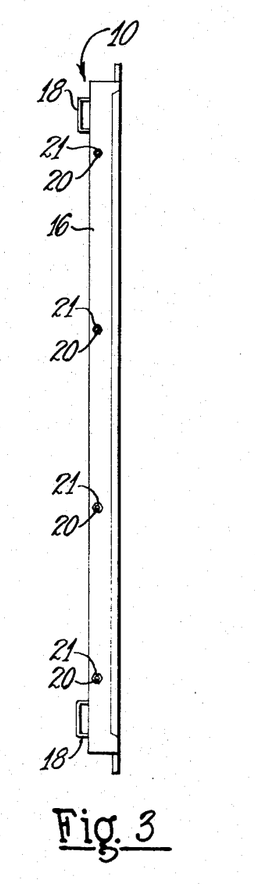
FIG. 3 is a side view of the construction shown in FIG. 1.

The tray or carrier 10 supports or mounts the molded fibrous unit 12 of connected rectangular configurations 14 which, when detached one from another, become individual or discrete bodies, tiles or panels 14a. The tray or carrier 10 includes side frame members or rails 16 and end rails or frame members 18, the rails 18 being preferable tubular, the pairs of rails being joined by welding or other means providing a rectangular frame or tray. Extending between the rails 16 and in spaced relation are wires or linear members 20, the end regions of the members extending through openings in the frame rails 16 are threaded to receive securing means such as nuts 21.

Figure 4:
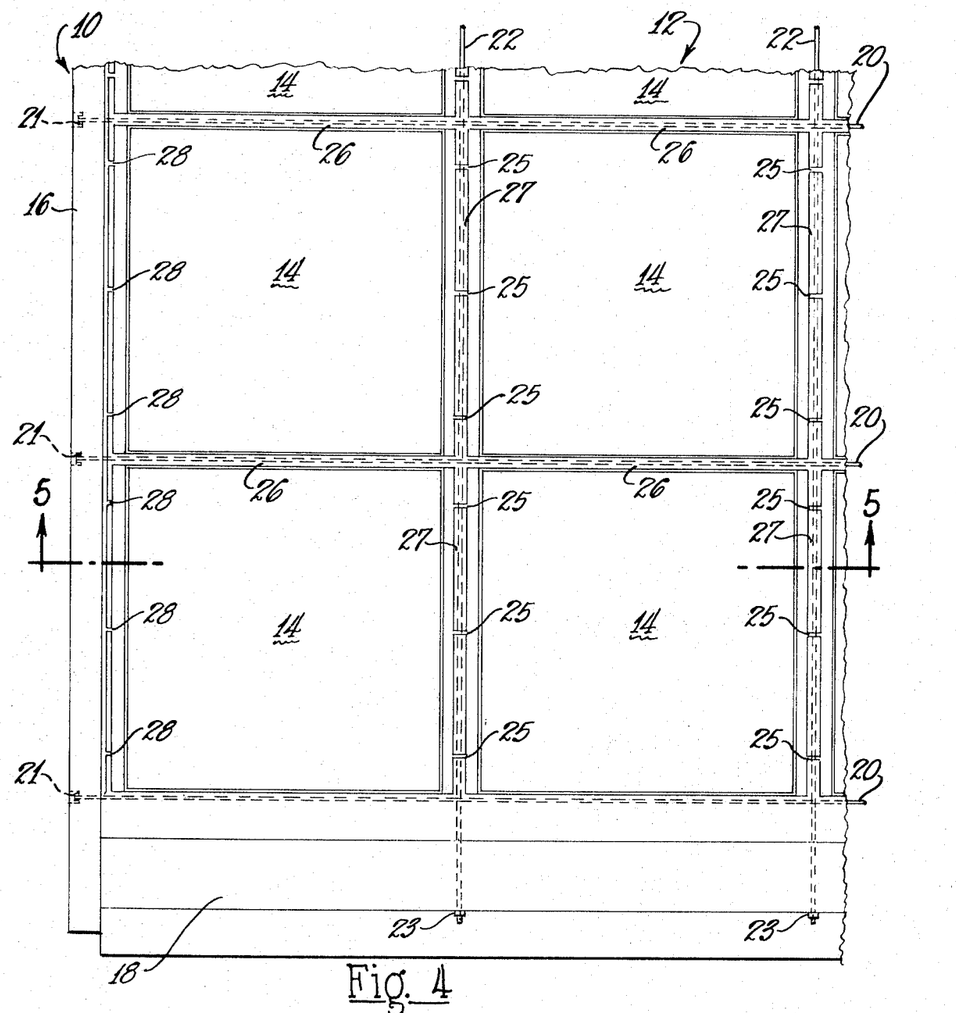
FIG. 4 is a top plan view of a portion of a tray illustrating connected molded bodies supported on the tray.

Extending transversely of the wires 20 are spaced linear members or wires 22, the end regions of the wires extending through openings in the rails and threaded to receive securing nuts 23. The several areas defined by the crossing wires 20 and 22 and the rails 16 are substantially square, the compressed body of fibers delineated by each area constituting a tile, panel or discrete body upon stripping or severing the bridges or bridge connections 25 of fibers between adjacent body or tile configurations. As shown in FIG. 4, the connectors or bridges 25 are disposed adjacent the wires 22.

In the carrier or tray illustrated, the wires 20 and 22 and the tray rails 16 define nine areas, each of square configuration so that upon severing the connecting bridges 25 of the molded fibrous unit, nine discrete or individual square tiles, panels or bodies are formed. During the molding operation, the molding dies sever narrow strips 26 from the body of fibers adjacent each of the wires 20, the waste strips being shown in FIG. 4.

During the molding operation, the narrow strips 27 of the material between adjacent tiles along the wires 22 are severed from the molded mass except the bridges or connections 25. The regions of the molded unit adjacent the rails 16 are severed by the dies during the molding operation except the bridges or bridge connections or connectors 28, shown in FIG. 5, which connect the individual tile configurations with the waste material adjacent the rails 16.

Figure 6:
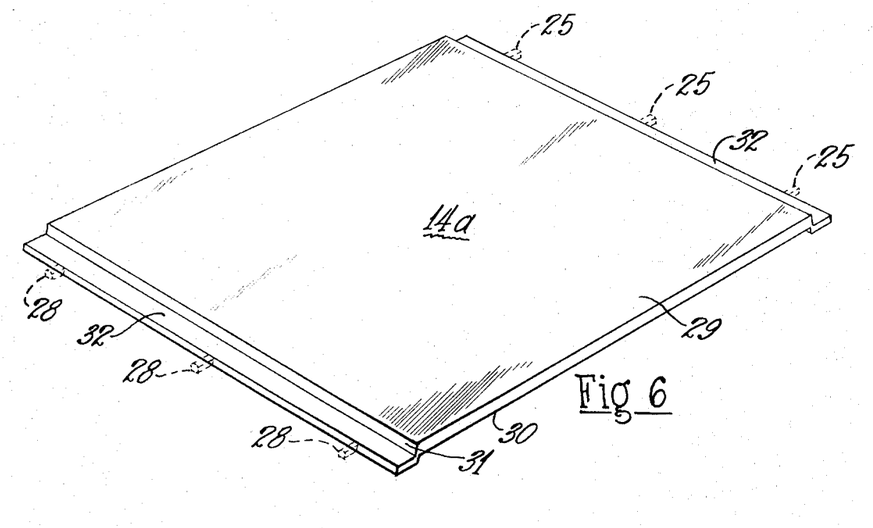
FIG. 6 is an isometric view of an individual body, tile or panel severed or stripped from the molded unit of several bodies.

FIG. 6 illustrates one of the individual bodies, tiles, surfacing units or panels 14a after it is stripped or severed from a molded unit 12. The body, tile or panel 14a includes a central planar region 29 which provides the obverse or exposed or decorative surface when the tiles or surfacing units are installed on a ceiling or wall of a room. The fibers are compressed in the mold so that the central region 29 is comparatively thin but substantially rigid by reason of the high density of the compressed fibers of 10 pounds per cubic foot or more.

The tile or surfacing unit 14a is fashioned with a pair of oppositely disposed flanges 30 and the other pair of oppositely disposed edge configurations or flanges 31 are provided with integral projections or tabs 32. In assembling the tiles on a ceiling or wall surface, the tabs 32 extend under the flanges 30 of adjacent tiles. The tabs 32 provide means for securing the tiles to wall or ceiling surfaces by nails or staples driven through the tabs 32.

Figure 5:
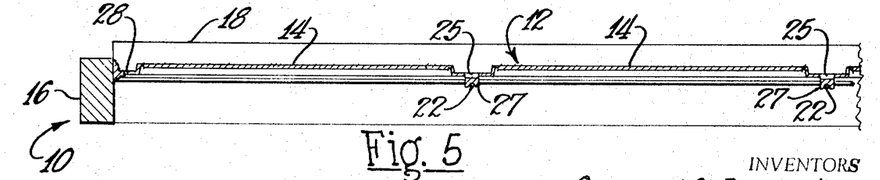
FIG. 5 is a sectional view taken substantially on the line 5—5 of FIG. 4.

The relative positions of the bridges or bridge connections 25 and 28 with respect to the tabs 32 of a tile adjacent a side rail 16 of a carrier 10 before the bodies, tiles or panels 14a are severed from a molded unit 12 are illustrated in broken lines in FIG. 6. The tile configurations 14 of the central row of a molded unit 12 are joined with adjacent tile configurations by bridges or connectors 25, as shown in FIGS. 4 and 5.

Figure 7:
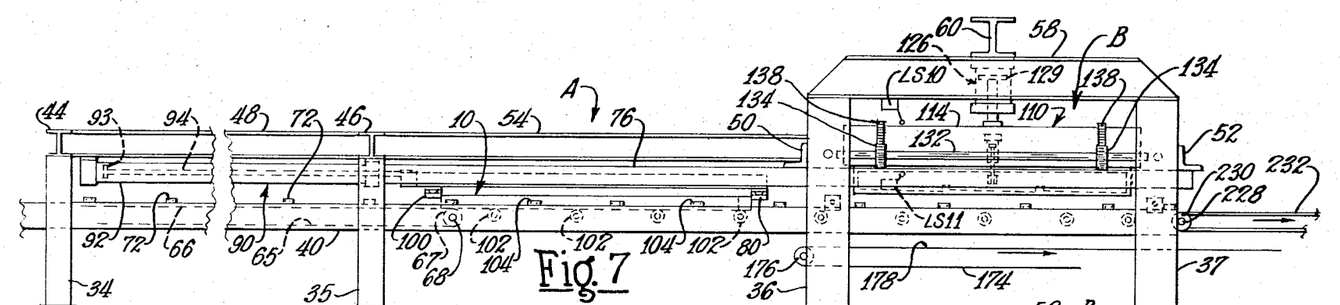
FIG. 7 is a side elevational view illustrating a form of apparatus for carrying on the method of the invention.
Figure 8:
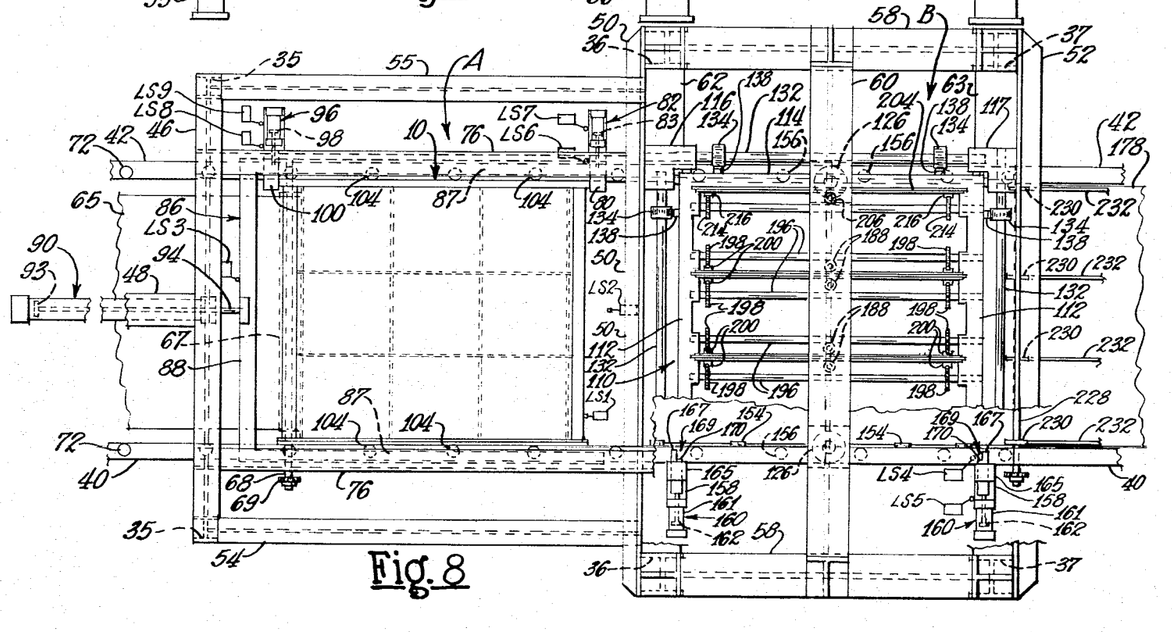
FIG. 8 is a top plan view of the apparatus illustrated in FIG. 7.

The apparatus for carrying out the method of severing or stripping the individual bodies, panels or tiles 14a from a molded mass or molded unit 12 mounted or supported on a carrier or tray 10 is illustrated in FIGS. 7 through 11. The apparatus includes a frame structure comprising pairs of transversely-spaced vertical frame members or struts 34, 35, 36 and 37. The opposed struts of each pair of struts 34 and 35 are secured respectively to longitudinally extending members 40 and 42. A transversely extending beam or frame member 44 is secured to the upper ends of the struts 34 and a beam or frame member 46 is secured to the upper ends of the struts 35 as shown in FIGS. 7 and 8.

Secured to each of the members or beams 44 and 46 and disposed centrally of the apparatus is a longitudinally extending beam or frame member 48. A transversely extending beam or frame member 50 is connected with the struts 36, and a similar transversely extending beam 52 is connected with the struts 37. Transversely-spaced longitudinally-extending beams or frame members 54 and 55 are connected at their ends with the struts 35 and with the transversely extending member 50.

Longitudinally extending beams 58 are joined with the upper ends of each of the pairs of struts 36 and 37. Mounted on the beams 58 and extending transversely is a central beam or frame member 60. The pairs of struts 36 and 37 are connected intermediate their ends with transversely extending frame members 62 and 63.

The apparatus is inclusive of a tray advancing means or conveyor 65, the conveyor illustrated being of the endless belt type, referred to herein as an infeed conveyor, for conveying trays or carriers 10 bearing molded units of fibrous tile configurations 14 in connected condition to an aligning station A, shown in FIGS. 7 and 8. The endless belt conveyor 65 is engaged with or embraces a guide roll 67 mounted on a shaft 68 journaled in bearings carried by the frame members 40 and 42. The conveyor 65 is driven by a motor and driving chain (not shown) connected with a driven sprocket 69 mounted on the shaft 68 whereby the upper flight 66 of the conveyor is advanced in a right-hand direction as viewed in FIGS. 7 and 8. The tray advancing means may be of the conventional driven roller type in lieu of the endless belt type.

The conveyor or tray advancing means 65 is arranged to successively convey the trays to the position of a tray 10 shown at the aligning station A in FIGS. 7 and 8. The frame members 40 and 42 are provided with journally supported rollers 72 for guiding a tray or carrier 10 to the aligning station A. Means are provided for positioning a tray 10 at the aligned station and for locking the tray in a tray-transferring means for transferring a tray from the aligning station A to a severing station B at which severing or striping devices separate, detach or subdivide the molded unit 12 into individual or discrete bodies, tiles or surfacing units 14a.

Transversely-spaced members 76 are connected with the members 46 and 50, shown in FIGS. 7 and 8. The members 76 form guide means for an arrangement for transferring a tray from the aligning station A to the severing or stripping instrumentality at station B which is also referred to herein as a tile knock-out mechanism or device. As shown in FIG. 8, the tray-positioning means includes a front movable abutment 80, adapted to be moved to a position to be engaged by an end region of the frame of a carrier 10 as illustrated in FIG. 8 to predetermine the position of the tray at the aligning station A.

The means includes a fluid operated actuator 82 preferably of the air pressure operated type having a cylinder accommodating a reciprocable piston and rod construction 83 connected with the abutment or stop means 80 for moving the abutment 80 into and out of tray-engaging position. A conventional solenoid operated valve V1, shown schematically in FIG. 14, controls air flow of air into and out of the actuator 82, the solenoid operated valve means being controlled by a relay as hereinafter explained.

The tray-transferring means at the aligning station A includes a reciprocating tray engaging yoke, fork or carriage 86 comprising parallel leg portions 87 and a transverse bar or member 88. The leg portions 87 of the yoke or carriage 86 are guided in a rectilinear path by the guide members 76. The yoke or carrier 86 is arranged to be reciprocated to move successive trays from the aligning or transfer station A into proper position at the severing or stripping station B.

Secured to and carried by the longitudinally extending beam 48 is a fluid-operated actuator 90, preferably of the air pressure actuated type, and includes a cylinder 92 in which is disposed a reciprocable piston 93 and connecting rod 94, the latter being connected to the transverse bar 88 of the carriage 86. The flow of air into and out of the cylinder 92 is controlled by a conventional solenoid operated valve V4, shown schematically in FIG. 14, controlled by a relay hereinafter described. A limit switch LS1 is adapted to be engaged by the tray 10 when the latter is in a position engaging the abutment 80.

Means is provided for locking the tray 10 against the abutment 80 in the carriage or transfer means 86. The means is inclusive of a fluid-operated actuator 96 comprising a cylinder containing a piston and rod construction 98 connected with a rear abutment member or locking means 100, the locking means or abutment 100 being reciprocable into and out of locking engagement with a tray 10 for locking the tray in the yoke or carriage 86 preparatory to movement of the carriage and transfer of a tray to the severing or stripping station B.

Figure 14:
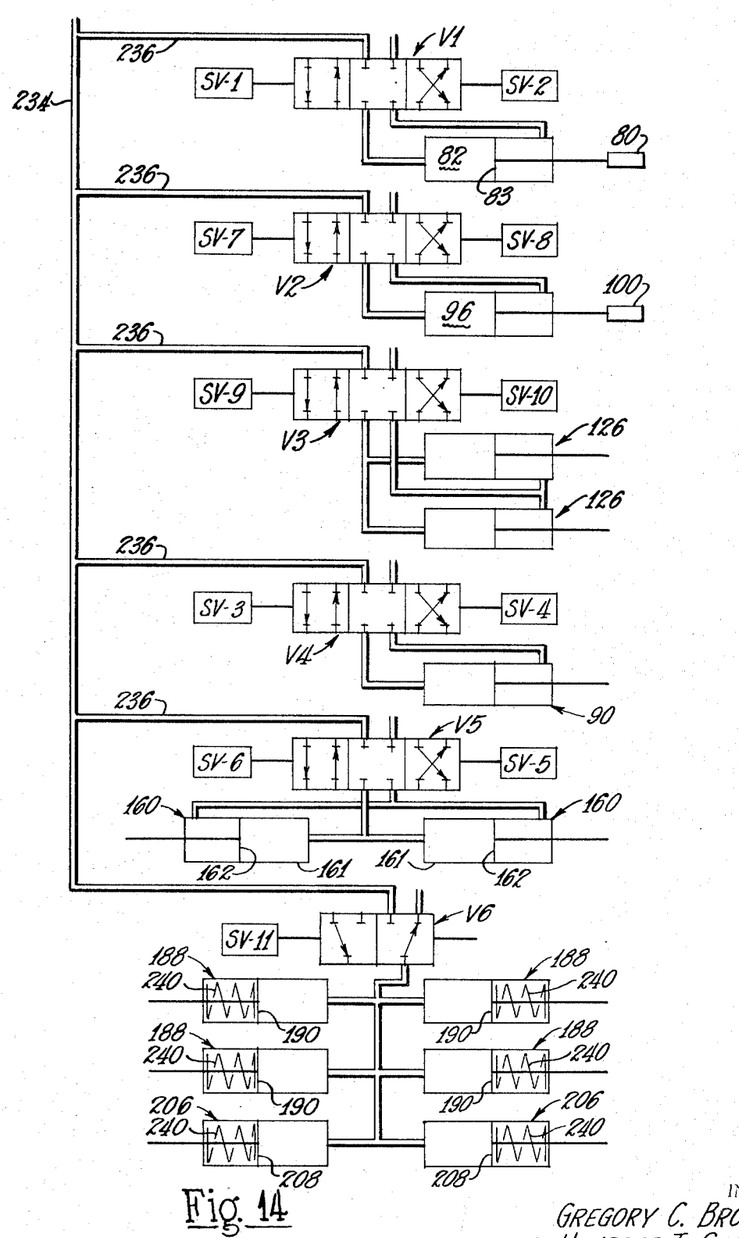
FIG. 14 is a schematic diagram of the electrically controlled fluid pressure operated actuators for operating or actuating components of the apparatus.

The actuator 96 is preferably of the air actuated type, the air flow being controlled by a conventional solenoid operated valve V2, shown schematically in FIG. 14, controlled by a relay. A limit switch LS8 is actuated when the locking means or member 100 is in extended position in locking engagement with the tray 10, the tray being illustrated in locked position in the carriage in FIG. 8.

The abutment or locking means 100 secures the tray 10 in proper position in the yoke or carriage 86 so that the tray may be transferred by the yoke to an accurate position at the severing or stripping station B. The tray 10 at the aligning station A is supported by rotatable rollers 102, shown in FIG. 7, journally supported by means mounted on the longitudinally extending members 40 and 42. The tray 10 is engaged by guide rollers 104 mounted on the members 40 and 42 for guiding and positioning the tray 10 with respect to the leg portions 87.

Figure 9:
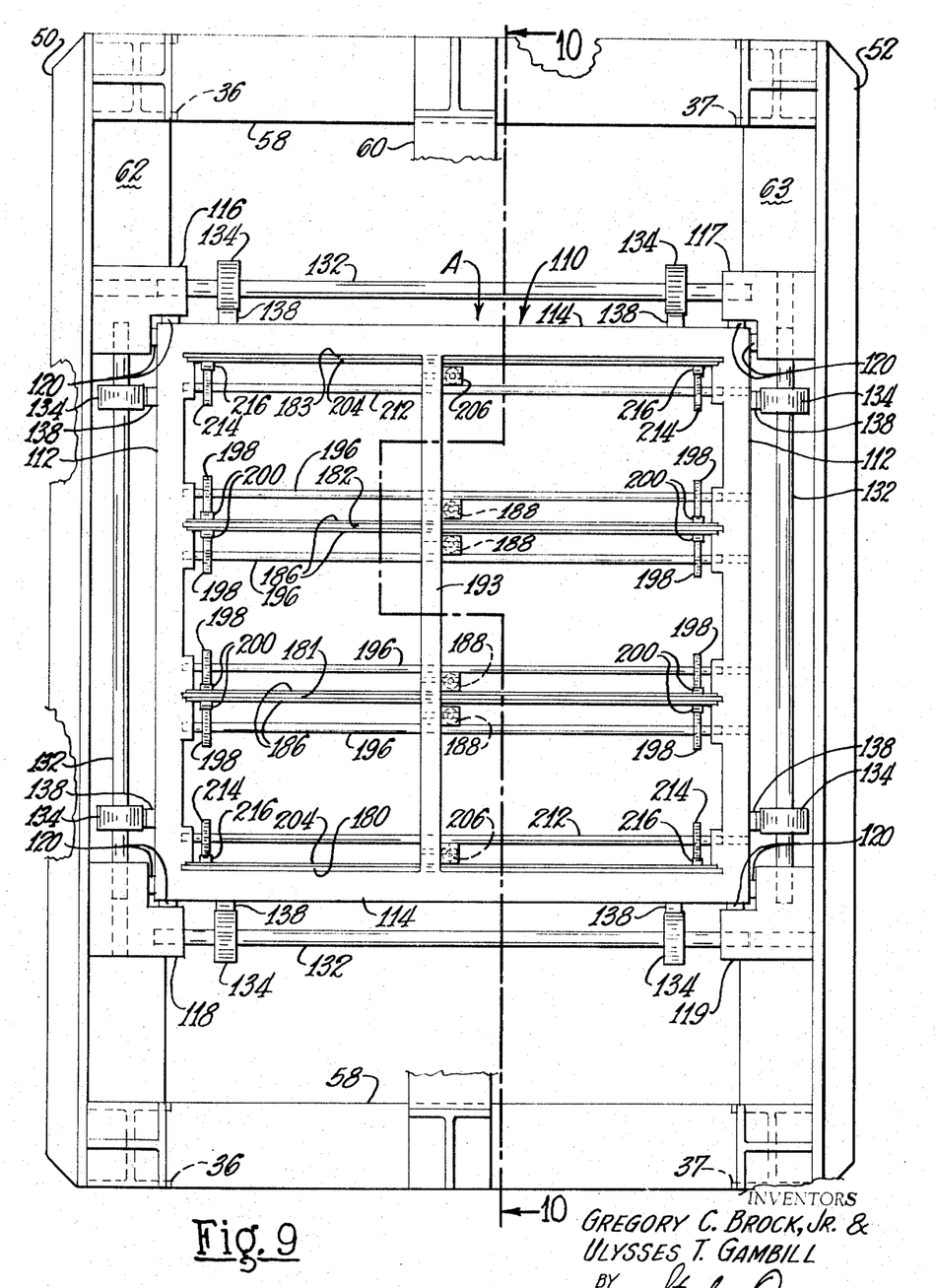
FIG. 9 is an enlarged plan view illustrating the severing or stripping instrumentalities for separating the connected molded bodies.
Figure 10:
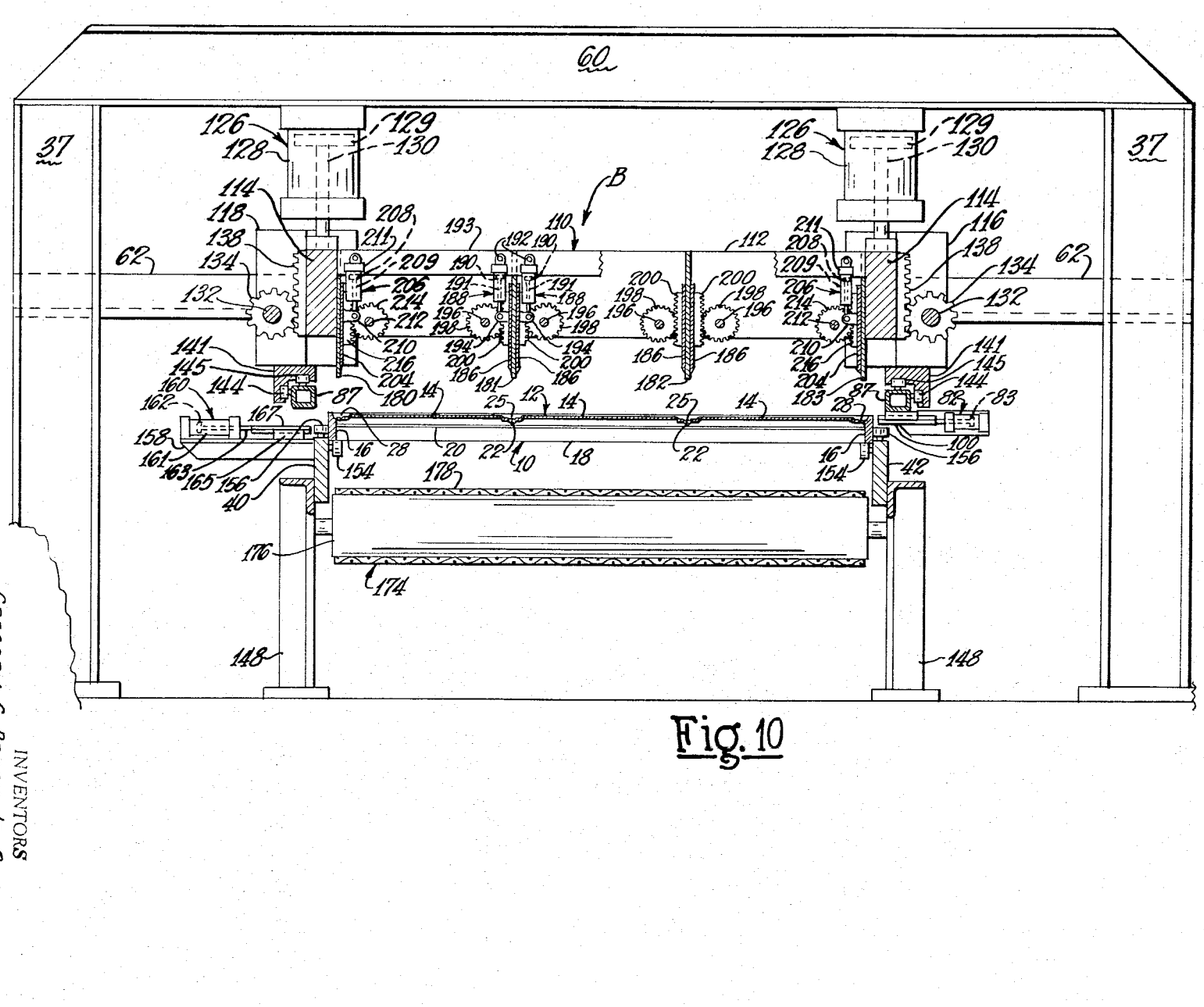
FIG. 10 is a vertical sectional view taken substantially on the line 10—10 of FIG. 9.

The severing or stripping apparatus or instrumentalities and operating components at the stripping station B are illustrated in FIGS. 7 through 10, the severing means being particularly shown in detail in FIGS. 9 and 10. The severing or stripping apparatus is inclusive of a vertically reciprocable or movable head construction or means 110 comprising a pair of spaced members 112 and members 114 integrally joined thereto providing a head construction of substantially rectangular shape. Disposed adjacent each of the corners of the head 110 are vertically disposed struts 116, 117, 118 and 119, shown in FIG. 9.

Each of the struts is equipped with inserts 120 providing vertical ways for accurately guiding the head 110 in its vertical reciprocating movements. The struts 116 and 118 are supported by frame members 62 and the struts 117 and 119 supported by frame members 63. The head 110 is reciprocated by fluid pressure operated actuating means or actuators. With particular reference to FIG. 10, actuators 126 are mounted on and depend from the beam 60. Each actuator is inclusive of a cylinder 128, piston 129 reciprocable therein and a piston rod 130 connected with the central or mid region of a member 114 of the frame.

Journaled in bearings in struts 116, 117, 118 and 119 are four shafts 132. Fixedly mounted on each of the shafts is a pair of spur gears 134. Each of the members 112 and 114 is provided with a pair of toothed rack means or members 138, each of the spur gears 134 being enmeshed with the teeth of the adjacent rack means or member 138. This arrangement assures vertical reciprocating movement of the head 110 without tilting.

Secured to and depending from the pair of struts 116 and 117 is a member 140 and depending from the struts 118 and 119 is a similar member 141. The members 140 and 141 provide support and guide means for the spaced parallel leg portions 87 of the yoke 86 at the severing or stripping station B. as shown in FIG. 10, each of the members 87 of the yoke 86 is equipped with a first set of rollers 144 which traverse lengthwise slots provided in each of the members 140 and 141. Each of the leg members 87 of the yoke 86 is equipped with a second set of rollers 145 disposed on vertical axes and extending into guide slots or recesses provided in each of the members 140 and 141.

As shown in FIG. 10, the members 40 and 42 are mounted on additional supporting struts 148. The members 40 and 42 are each provided with rollers 154 rotatable about horizontal axes for supporting the rails 16 of a tray 10 at the severing or stripping station. The members 40 and 42 are each provided with rollers 156 rotatable about vertical axes for guiding the tray 10 in the region of the severing or stripping station B.

Means is provided for accurately positioning the tray 10 at the severing or stripping station B to enable the severing of the bridge portions 25 and 28 connecting adjacent molded fibrous sections, bodies or tile configurations 14 of the molded fibrous unit 12 carried by a tray. Secured to member 40 are laterally extending brackets or members 158 supporting fluid operated actuators 160, shown in FIGS. 8 and 10, each actuator comprising a cylinder 161 containing a reciprocable piston 162 mounted upon a piston rod 163. Mounted upon each bracket 158 is a guide block or means 165 for guiding a plunger or abutment 167 carried by the piston rod 163.

As shown in FIG. 8, each of the abutments 167 is fashioned with a recess 169 defined by a ledge 170. The linear distance between the inner opposed surfaces of the projections 167 is of a dimension to snugly embrace the rails of a tray 10 when the tray is at the severing or stripping station B. When the tray is moved by the yoke 86 into the severing or stripping station, the plungers or abutments 167 are in retracted position, that is, at the left-hand position as viewed in FIG. 10.

When the tray is moved into the severing station, pressure fluid, such as compressed air, is admitted into the outer ends of the cylinders 161, moving the pistons 162 in a right-hand direction to engage the locking means or projections 167 with the exterior surfaces of end rails of a tray with the adjacent corner regions of the tray nested or fitting into the recesses 169. The ends of the plungers 167 engage the left-hand rail 16 of the tray 10 as viewed in FIG. 10, forcing the tray laterally to engage the opposite rail 16 with the rollers 156 carried by member 42, the actuator 160 continuing to exert lateral pressure on the tray during a severing or stripping operation.

Disposed beneath the severing or stripping instrumentalities at station B is a conveyor means 174 of the endless belt type disposed for movement in a horizontal direction, the belt being supported upon rolls, one of which is shown at 176 in FIGS. 7 and 10, the rolls 176 being journalled in bearings mounted in frame members (not shown), the belt conveyor 174 being preferably of the reticulated metal type or of the chain link type. The upper flight 178 of the conveyor 174 moves in a right-hand direction, as viewed in FIG. 7, for conveying away the individual tiles 14a after the tiles have been severed or stripped from a supporting tray 10, the tiles 14a falling by gravity onto the flight 178 of the conveyor.

The apparatus at the severing or stripping station B is of a character to sever the connectors or bridges 25 and 28 which join the tiles 14 of a tile assembly 12 together and to the material adjacent the tray rails 16. The reciprocable head 110 is equipped with vertically disposed plates or plate-like members 180, 181, 182 and 183, the plates 181 and 182 being disposed for vertical registration with the wires 22 of the tray 10, the plates 180 and 183 being in registration with the connecting bridges 28 adjacent the rails 16 of the tray.

Disposed at opposite sides of the plates 181 and 182 are vertically movable severing or stripping members or knives 186. Each of the knives 186 is vertically reciprocated by a fluid operated actuator 188, each comprising a cylinder containing a piston 190 reciprocable in the cylinder, each piston being mounted upon a piston rod 191 as shown in FIG. 10. The upper end heads 192 of the actuators 188 are secured to a transversely extending member 193 of the head 110.

Each pair of the piston rods 191 is pivotally connected with a U-shaped bracket 194 secured to the adjacent severing knife or blade 186. The actuators 188 for the knives 186 are disposed adjacent the central region of the severing apparatus as shown in FIG. 9. Disposed in parallelism with each of the pairs of severing blades or knives 186 is a pair of shafts 196, the shafts being journaled in suitable bearings mounted by members 112 of the head 110. Secured upon each of the shafts 196 adjacent their respective end regions are spur gears 198.

Fixedly mounted upon each of the severing blades 186 adjacent each spur gear 198 is a toothed or rack member 200, the teeth of which are enmeshed with the adjacent spur gear 198. Through the spur gear and rack arrangement, the severing blades or knives 186 are vertically reciprocable throughout their respective lengths without tilting Disposed adjacent one side of each of the plates 180 and 183 is a severing blade or knife 204.

The severing blades 204 are reciprocated by fluid operated actuators 206, each actuator comprising a cylinder containing a reciprocable piston 208 mounted on a rod 209 connected with a bracket 210 secured to the adjacent severing blade 204. The heads 211 of the actuator cylinders are secured to the member 193 of the head 110. As particularly shown in FIG. 9, a shaft 212 disposed adjacent each end region of the head 112 is journally supported in bearings mounted by the head.

Fixedly mounted on each shaft 212 adjacent the end regions thereof is a spur gear 214 which is enmeshed with a toothed or rack member 216, each rack member being secured to the adjacent severing blade 204. Through the arrangement of spur gears and rack members connecting each of the shafts 212 with one of the severing knives 204, the vertical movement of each severing blade 204 is uniform throughout its stroke without tilting. The knives or severing blades 186 and 204 are substantially the same and are of the character illustrated in FIG. 11.

Figure 11:
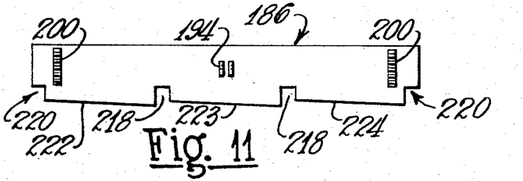
FIG. 11 is an elevational view of one of the fiber severing instrumentalities.

As shown in FIG. 11, a severing blade 186 is fashioned with a pair of spaced recesses 218 and at the lower corner regions with notches or recesses 220. The recesses 218 are spaced a linear distance so that when the knives move downwardly into engagement with the bridges or connectors 25 between adjacent tiles, the recesses 218 accommodate the two spaced wires 20 of the tray shown in FIG. 1. The notches or recesses 220 at the lower edge regions of each severing blade accommodate the wires 20 adjacent each rail 18 of the tray so that there is no engagement of the severing blades with any of the wires 20 of the tray construction.

In order to facilitate severing of the connecting bridge portions or connectors 25 between adjacent tile configurations 14, the severing edges of each knife 186 and 204 comprise three edge sections 222, 223 and 224. The edge sections 222 and 224 between the recesses or notches 218 and 220 and the central edge section 223 between the recesses 218 are disposed at a slight angle with respect to a horizontal plane in order to provide a progressive severing or cutting action of the bridge sections during downward movements of the severing blades or knives.

Means is provided for conveying the trays away from the severing station after the individual tiles 14 are severed or stripped from the trays and fall or descend onto the conveyor 174. Referring to FIGS. 7 and 8, a shaft 228 is journally supported at its ends in bearings mounted by frame members 40 and 42. In the embodiment illustrated, four pulleys 230 are fixedly mounted on the shaft in spaced relation, the shaft being driven by a motor (not shown). Engaging each of the pulleys are endless belts 232 which engage another set of pulleys (not shown) spaced in a right-hand direction from the apparatus shown in FIGS. 7 and 8.

The belts 232 are driven whereby the upper flights of the belts move in a right-hand direction as viewed in FIGS. 7 and 8, the upper flights of the belts 232 being adapted to convey the trays away from the severing or stripping station B after the tiles 14 are stripped from a tray, an empty tray being pushed onto the conveyor belts 232 by the abutment 80 on the yoke 86 engaging the empty tray as a succeeding tray is advanced to the severing station B by the yoke 86. As shown in FIG. 7, the conveyor belt means 232 are disposed above the flight 178 of the conveyor 174 whereby the empty trays are conveyed away from the severing station above the tiles disposed on the lower conveyor 174. Through this arrangement the empty trays are maintained separate from or independently of the bodies or tiles 14a.

The several actuators for components of the apparatus are of the fluid pressure operated type and may be actuated by compressed air, oil or other suitable fluid under pressure. In the illustrated embodiment the fluid preferably employed is compressed air and is supplied to the control valves and actuators from a source of compressed air through a manifold line 234 and branch pipes 236, shown schematically in FIG. 14, to the control valves V1 through V6 for the actuators hereinafter described. Where compressed air is used as the motive medium, the control valves may be vented to the atmosphere. In event oil under pressure is used as a motive medium, the vent tubes from the control valves would be connected with an oil supply reservoir for returning the oil to the reservoir in a well known conventional manner.

Figure 12:
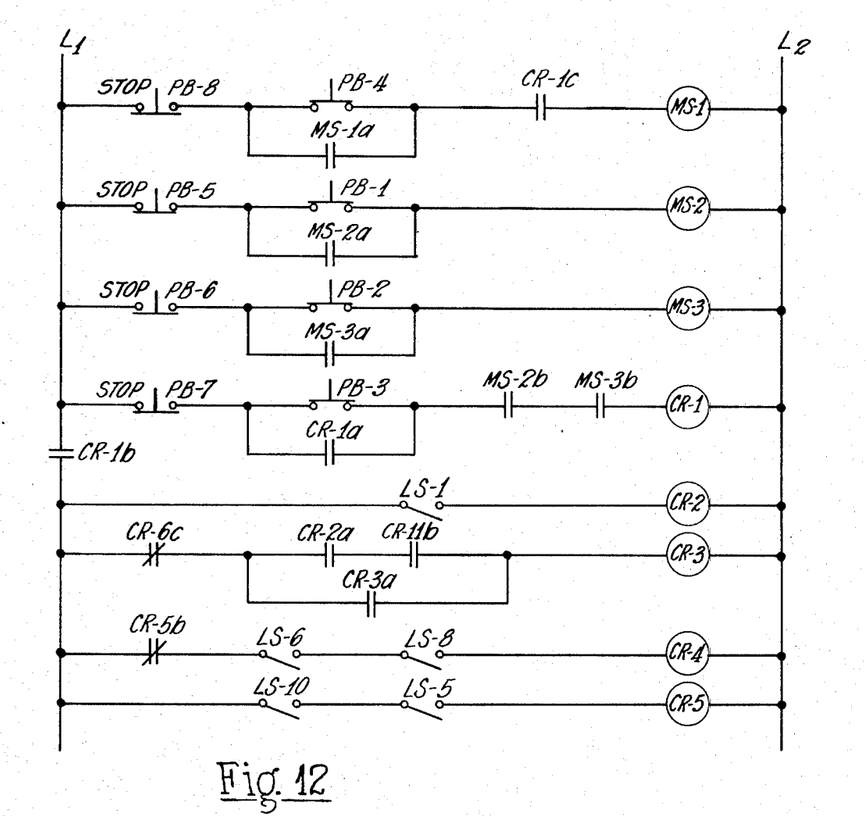
FIGS. 12 and 13 are schematic diagrams of the circuits and electrically actuated and controlled components for initiating and carrying on the steps of the method in proper sequence in effecting stripping of connected molded bodies from a supporting facility.
Figure 13:
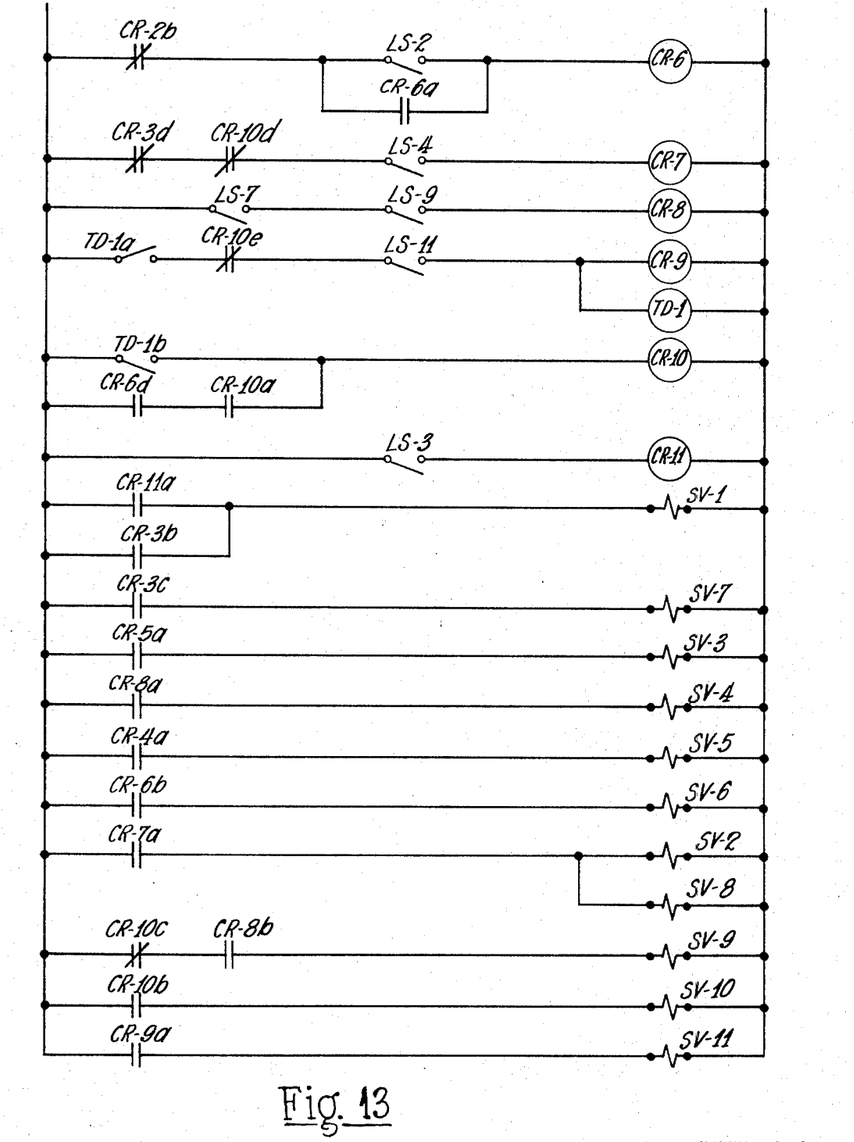

FIGS. 12 and 13 illustrate the circuits of the various electric controls respectively for initiating and activating components of the apparatus in their proper sequence of operation, FIG. 13 being a continuation of the circuit arrangement of FIG. 12. FIG. 14 illustrates schematically the fluid operated actuators for the movable components of the apparatus and the solenoid operated valves for controlling flow of fluid into and out of the actuators. Reference to the various control components in the circuits and the actuator-control valves of FIG. 14 will be made in connection with the description of the operation of the apparatus.

The following description of the operation of the apparatus is premised upon an initial start-up, the operations being automatic after an initial start-up. Trays 10, each mounting a molded unit comprising a plurality of bodies or configurations 14 connected by the bridges 25 and 28, are successively advanced in a right-hand direction toward station A, shown in FIGS. 7 and 8, by the moving infeed conveyor 65. The leading tray of the series of trays is illustrated at station A in FIGS. 7 and 8.

In initiating the operation of the apparatus the circuit arrangement includes four manually-operable starting switches for initiating operation of three motors and a control relay. With particular reference to FIG. 12, the manual stop switches PB-5, PB-6, PB-7 and PB-8 are in normally closed position. The operator closes the four push button switches in the following order or sequence: A first starting switch PB-1 is closed energizing a motor starter switch MS-2 which initiates operation of a conventional electrically energizable motor (not shown) driving the tray removal conveyor means or belts 232, shown in FIGS. 7 and 8.

Contacts MS-2a are closed and sustain the circuit to the motor switch MS-2 when the manual switch PB-1 is released. The relay contacts MS-2b are normally closed. The operator then manually closes the switch PB-2 energizing the motor starter switch MS-3, energizing a second motor (not shown) driving the conveyor 174 for conveying stripped bodies or tiles 14a from the severing or stripping station B. Relay contacts MS-3a are closed and sustain the circuit to motor starter MS-3 when the manual switch PB-2 is released. Contacts MS-3b are closed.

The operator then closes the manual switch PB-3 which energizes the relay CR-1 through the closed contacts MS-2b and MS-3b. Energization of relay CR-1 closes contact CR-1b which completes a power supply to the control circuit. Contacts CR-1a are closed and sustain the circuit to relay CR-1 when the manual switch PB-3 is released by the operator. The contacts CR-1c are closed.

When power is supplied to the control circuit through the closed contacts CR-1b, several components of the apparatus are in or cycled to the following positions: The yoke, fork or tray carrier 86 is in retracted position holding limit switch LS-3, shown in FIG. 8, in closed position which energizes relay CR-11. Energization of the relay CR-11 closes contacts CR-11a completing a circuit through the solenoid SV-1, shown schematically in FIGS. 13 and 14, shifting the valve V1, shown in FIG. 14, to admit pressure fluid, such as compressed air, into one end of the cylinder 83 of the actuator 82, shown in FIGS. 8 and 14.

Actuator 82 projects the abutment or dog 80 to its operative position to be engaged with a tray to be advanced into the yoke 86. Movement of the abutment 80 to its tray-engaging position closes limit switch LS-6. Contacts CRi11b are closed, the abutment or tray positioning or locking member 100, shown in FIG. 8, is retracted holding limit switch LS-9 in closed position. The head 110 is in elevated or raised position and limit switch LS-10 is held in closed position. The tray clamping means or positioning abutments 167 are in extended position and limit switch LS-4 is in closed position.

The operator then depresses or actuates push button switch PB-4, the closing of this switch energizing the motor starter switch MS-1 as relay contacts CR-1c are closed, energizing the third motor (not shown) driving the infeed tray conveyor 65. MS-1a contacts are closed and sustain the motor conveyor circuit when the manually actuated switch PB-4 is released. The trays bearing the units or assemblies of interconnected molded bodies or tiles 14 are advanced at timed intervals.

The first tray advanced by the conveyor 65 is transferred by the conveyor to the tray supporting rollers 102, shown in FIG. 7, the rollers supporting the tray as it is advanced to the body or tile severing or knock-out station B. The rollers 104 disposed at each side of a tray guide the tray until its forward movement is interrupted or stopped by the forward abutment or dog 80. When the tray is in engagement with the abutment 80, limit switch LS-1 is closed by the tray and the closing of switch LS-1 energizes relay contacts CR-2. Contacts CR-2b are opened de-energizing relay CR-6. Contacts CR-6d are opened de-energizing relay CR-10.

Relay contacts CR-6a are opened interrupting the circuit around the limit switch LS-2. Relay contacts CR-6b are opened which de-energize solenoid SV-6, shown in FIG. 14, returning the tray clamp control valve V5 to a neutral closed position. Contacts CR-6c are closed and contacts CR-10a are opened. Contacts CR-10b are opened de-energizing the solenoid SV-10 to return the head control valve V3 to the neutral closed position. Contacts CR-10c, CR-10d and CR-10e are closed. Contact CR-2a is closed energizing relay CR-3 through contacts CR-11b and CR-6c which are closed.

Contacts CR-3a close maintaining an energizing circuit around contacts CR-2a and CR-11b. Contacts CR-3b close to energize the solenoid SV-1 of valve V1, schematically illustrated in FIG. 14. Contacts CR-3c close energizing solenoid SV-7 shifting the valve V2 to admit pressure fluid to the cylinder of the actuator 96 above the piston 98, as viewed in FIG. 8, to advance the abutment or dog 100 to lock the tray between the forward abutment or dog 80 and the rear abutment or dog 100. Movement of the piston forwardly in the actuator 96 releases the limit switch LS-9.

When the rear abutment or dog 100 is fully extended in tray engaging and locking position, limit switch LS-8 is held closed, energizing relay CR-4 as limit switch LS-6 is closed and contacts CR-5b are closed. Contacts CR-4a close energizing solenoid SV-5 shifting the valve member of the control valve V5 to a position to effect retraction of the pistons of the actuators 160 in a left-hand direction, as viewed in FIG. 10, to retract the tray clamping or locking members 167. Retraction of the tray clamping members 167 releases limit switch LS-4.

When the tray clamps or locking members 167 are fully retracted to the position shown in FIG. 10, limit switch LS-5 is engaged and held in closed position energizing the relay CR-5 through limit switch LS-10 which is in closed position with the movable head 110 in raised position. Contacts CR-5b open, de-energizing relay CR-4. Contacts CR-4a open, de-energizing solenoid SV-5 and control valve V5 assumes a neutral or closed position. Contacts CR-5a close, energizing solenoid SV-3 shifting the control valve V4 to a position admitting pressure fluid into the left-hand end of the cylinder of actuator 90, as viewed in FIG. 8, the pressure acting on the piston 93 to advance the yoke or fork 86.

As the abutments or dogs 80 and 100 are in extended position locking the tray 10 to the yoke 86, the tray 10, the actuators 82 and 96 and the tray-locking abutments 80 and 100 are advanced with the yoke 86. As the yoke 86 and the tray 10 engaged thereby advance from the retracted position at station A toward the tile severing and knock-out station B, limit switch LS-3 is opened, de-energizing relay CR-11. Concomitantly therewith limit switch LS-1 is opened de-energizing relay CR-2.

Contacts CR-2a and CR-11b open, but contact CR-3a maintains the circuit to energize relay CR-3. Contacts CR-11a open but contacts CR-3b maintain the circuit to energize the solenoid SV-1. Contacts CR-2b close. As the yoke or member 86 is advanced toward station B, the extended abutment or dog 80 engages the empty tray that is under the severing or striping head 110 and pushes the tray away from the region of the head onto the conveyor 232 which conveys the empty tray away from the severing or knock-out station B.

When the yoke or member 86 is advanced to its full extended position, the tray and the molded body or tile unit carried thereby, held between the abutment blocks or locking blocks 80 and 100 is in an operative position under the head 110 in preparation for the step of severing, stripping or knocking out the bodies or tiles from the tray or support. When the tray bearing a molded unit reaches its position under the head 110, limit switch LS-2 is closed by the yoke 86 in its extended position energizing relay CR-6. Contacts CR-6c open, de-energizing relay CR-3, contacts CR-6a close and maintain the circuit around the limit switch LS-2. Contacts CR-6d close and contacts CR-3a open.

Contacts CR-3b open, de-energizing the solenoid SV-1. Contacts CR-3c open, de-energizing solenoid SV-7. Solenoids SV-1 and SV-7 and the valves V1 and V2 controlled thereby return to their respective closed or neutral positions. Contacts CR-3d close. Contacts CR-6b close, energizing the solenoid SV-6 which moves the valve V5 to admit pressure fluid into the outer ends of the cylinders 161 of actuators 160 at the left side of the pistons as viewed in FIG. 10 to advance the tray locking members or clamps 167 into engagement with the tray at the severing, stripping or knock-out station B to securely hold the tray in proper position under the head 110.

With the tray clamping members 167 in tray clamping position, limit switch LS-5 is opened de-energizing relay CR-5. Contacts CR-5a open, de-energizing solenoid SV-3, returning valve V4 to its neutral or closed position. Contacts CR-5b close. When the tray clamps 167 are in extended or tray-clamping position, limit switch LS-4 is held closed energizing relay CR-7 as contacts CRt3d and CR-10d are closed.

Contacts CR-7a close energizing solenoids SV-2 and SV-8 which shift the valves V1 and V2 to admit pressure fluid into the actuators 82 and 96 to retract the clamps, abutments or tray locking members 82 and 96 out of engagement with the tray 10 under the head 110 at the severing or stripping station to release the tray.

When the tray locking means or members 80 and 100 are fully retracted, limit switches LS-7 and LS-9 are held closed energizing the relay CR-8. Contacts CR-8a close energizing solenoid SV-4 to shift the valve V4 to a position admitting pressure fluid into the right-hand end of the cylinder of actuator 90 to retract the yoke 86 away from station B to station A preparatory to engaging a subsequent tray 10 bearing a molded body or suit. Contact CR-8b closes energizing solenoid SV-9 shifting the valve V3 to admit pressure fluid to the upper ends of the cylinders 128 of actuators 126 and above the pistons 129 to move the head 110 carrying the severing or stripping device downwardly.

When the head 110 is at its lowermost position, the hold down blades, members or plates 180, 181, 182 and 183 compress the waste or trim material on the wires or linear members 22 of the tray 10. The head 110 in its lowermost position holds limit switch LS-11, shown in FIG. 8, closed, energizing relay CR-9 and a time delay relay TD-1 as the circuit therefor is completed through closed contacts CR-10e and contacts TD-1a.

Contacts CR-9a close, energizing solenoid SV-11 shifting the valve V6 to a position to admit pressure fluid into the upper ends of the cylinders of actuators 188 and 206 forcing the pistons 190 and 208 downwardly, moving the severing or stripping blades or knives 186 and 204 downwardly, severing the bridge regions or connectors 25 and 28 shown in FIGS. 4 and 6, the connectors 25 being between adjacent tiles, as shown in FIG. 4, and the connectors 28 being at the edge regions of the tiles adjacent the rails 16 of the tray 10.

In severing the bridges or connectors 25 between adjacent body sections or tiles 14, the severing or stripping blades 186 straddle the wires 22, and the severing blades or knives 204 sever the material at the edges of the outer tiles adjacent the rails 16 of a tray 10. The severing action of the blades 186 and 204 completely sever, strip or detach each of the nine tiles or discrete bodies 14 one from another, and the individual tiles or bodies 14a fall by gravity onto the upper flight 178 of the conveyor 174 and are conveyed away from the stripping or severing station B for further processing When the preset time of time delay relay TD-1 expires, contacts TD-1a open, de-energizing relay CR-9 and time delay relay TD-1 automatically resets. Contacts CR-9a open, deenergizing solenoid SV-11 returning the valve V6 to exhaust or cylinder venting position, shown schematically in FIG. 14. When the fluid pressure is relieved from the pistons 190 and 208, the expansive springs 240 beneath the pistons, having been compressed by the fluid pressure, move the pistons 190 and 208 to their uppermost positions, as viewed in FIG. 10, retracting the severing or stripping blades or knives 186 and 204 to their uppermost positions.

When the preset time on time delay relay TD-1 expires, contacts TD-1b close, energizing relay CR-10. Contacts CR-10a close and maintain the circuit to relay CR-10 around time delay contacts TD-1b as contacts CR-6d are closed. Contacts CR-10c open, de-energizing solenoid SV-9 and control valve V3 returns to a neutral or closed position. Contacts CR-10b close, energizing solenoid SV-10, shifting the valve V3 to admit pressure fluid in the lower ends of the cylinders 128 of the actuators 126, shown in FIG. 10, to elevate the pistons 130 and raise or elevate the head 110 to its uppermost or out-of-use position.

The head 110, in its uppermost position, releases limit switch LS-11 to normally open position. Contacts CR-10d open, de-energizing relay CR-7, and contacts CR-7a open, de-energizing solenoids SV-2 and SV-8 returning valves V1 and V2 to neutral or closed position. Contacts CR-10e open, insuring de-energizing of relay CR-9 when time delay relay TD-1 automatically resets. During the period of operation and retraction of the severing or stripping knives 186 and 204 and during the period that the head 110 is being raised to its uppermost position, the tray moving yoke or fork 86 is moving toward its retracting position, viz. toward the position illustrated in FIG. 8.

When the yoke or member 86 reaches its fully retracted position, it closes limit switch LS-3 energizing relay CR-11. Contacts CR-11a close, energizing solenoid SV-1 to shift the valve V1 to a position to admit pressure fluid in the right-hand end of the cylinder of actuator 82, as viewed in FIG. 10, to extend the abutment or tray engaging member 80 in a position to be engaged by a succeeding tray. Limit switch LS-7 is released, de-energizing relay CR-8.

Contacts CR-8a open, de-energizing solenoid SV-4 returning valve V4 to its neutral or closed position. Contacts CR-8b open. When the abutment or tray positioning member 80 is fully extended, LS-6 is held closed. At this period in the operation, the apparatus is ready for recycling with the advancement of a succeeding tray carrying a molded unit by the tray feeding conveyor 65 to the position indicated at station A in FIG. 8 adjacent the yoke 86.

The actions performed by the operator in stopping the operation of the apparatus or machine are as follows: The operator depresses push button switch PB-5 which interrupts the circuit to the motor starter switch MS-2 and de-energizes the motor (not shown) which operates the tray removal conveyor 232. Contacts MS-2a open, and contacts MS-2b open de-energizing relay CR-1. Contacts CR-1b open, interrupting the power supply to the control circuitry for the relays and solenoids of the solenoid operated valves. All of the valves shift to normally closed positions preventing further operation of the fluid-operated actuators for various components of the apparatus.

Contacts CR-1a open. Contacts CR-1c open, de-energizing the circuit through the motor starter switch MS-1 to deenergize the motor (not shown) driving the tray infeed conveyor 65 to stop the operation of the conveyor. Contacts MS-1a open.

When the operator depresses the push button switch PB-6, the motor starter switch MS-3 is de-energized, stopping the motor driving the tile removal conveyor 178. Contacts MS-3a open. Contacts MS-3b open deenergizing relay CR-1. Shut down of the operating components occurs from the de-energization of the relay CR-1 in the sequence of actions described above taking place as when the push button stop switch PB-5 is depressed and the circuit of the relay CR-1 interrupted.

The operator may de-energize relay CR-1 by depressing the push button switch PB-7 and shut down of the operating components occurs as when relay CR-1 is de-energized by opening push button switch PB-5 as above described.

In the event it is desired to interrupt advancement of trays toward station A without affecting the other operating components, the operator depresses push button switch PB-8 interrupting the circuit to the motor starter switch MS-1 and the motor driving the tray in-feed conveyor 65, stopping the conveyor and opening contacts MS-1a.

Through the use of the method and apparatus of the invention molded units, each carried by or adhered to a tray or portable support, employed during the molding operation, wherein each molded unit comprises a plurality of connected molded body configurations or sections, are successively advanced to a severing or stripping station at which the individual body configurations or sections are detached one from another and separated from the trays enabling the reuse of the trays in further molding operations.

While in the illustrated embodiment a molded unit on a tray comprises nine substantially identical connected configurations or sections providing nine individual bodies or tiles when severed or stripped from a tray, it is to be understood that a molded unit may embody a more or lesser number of molded configurations or sections in connected relation for processing through the method and apparatus of the invention. For example, a molded unit may comprise four tile configurations or six tile configurations arranged in two rows of three each. However, it is found preferable to mold the plurality of bodies in a unit of square configuration as better heat distribution during a molding operation is attained throughout the area of the molded unit.

Where the molded unit mounted by a tray 10 comprises resin-bonded compressed fibers, the density of each of the body or tile sections 14 is preferably in a range of from twelve to twenty pounds or more per cubic foot whereby the discrete bodies or tiles 14a are of substantially rigid character.

In the embodiment of the discrete body or tile illustrated in FIG. 6, the central or planar section is about twelve inches square and from about one-sixteenth of an inch to one-eighth of an inch in thickness, but it is to be understood that the molded unit carried by the tray may comprise body sections or tile configurations of other dimensions for processing by the method and apparatus of the invention.

It is apparent that, within the scope of the invention, modifications and different arrangements may be made other than as herein disclosed, and the present disclosure is illustrative merely, the invention comprehending all variations thereof.

We claim:

1. The method of processing a molded body comprising a plurality of sections of severable molded material connected by connecting regions and supported on linear supports at spaced linear regions on a tray including the steps of delivering the tray bearing the molded body to a severing station, severing the connecting regions of the material adjacent the sections at the spaced linear regions to detach the sections from the linear supports and from the tray, and removing the tray from the severing station.

2. The method of processing a body of connected molded sections of bonded fibers supported on linear supports at spaced linear regions on a tray including the steps of delivering the tray bearing the body of connected molded sections to a severing station, securing the tray in a predetermined position at the severing station, and severing the connecting regions of the bonded fibers adjacent the sections at the linear supports of the tray to detach the molded sections one from another and from the linear supports.

3. The method of severing connected sections of a molded body of severable material mounted on a tray with the body supported on linear supports at spaced linear regions adjacent the sections including delivering the tray and molded body to a first station, engaging the tray with a carrier, advancing the carrier and tray mounting the molded body to a second station, severing at the second station the connecting regions at the linear supports adjacent the sections of the molded body to separate each of the sections from the linear supports and the tray as a discrete body, and removing the discrete bodies from the second station independently of the empty tray.

4. The method of processing a body of connected molded tiles of bonded fibers supported at linear regions adjacent the tiles including delivering the tray and body of molded tiles to a first station, engaging the tray with a carrier, advancing the carrier and tray mounting the body of molded tiles to a second station, severing at the second station the connecting regions adjacent the tiles to separate each of the tiles from the tray, retracting the carrier to the first station in a position to receive a succeeding tray mounting a body of connected molded tiles, and removing the discrete tiles from the second station.

5. The method according to claim 4 including removing the empty tray from the second station by advancement of the carrier toward the second station.

6. The method of processing a molded body of molded sections of resin-bonded fibers connected and supported at spaced linear regions on a tray including the steps of delivering the tray bearing the molded body to a positioning station, engaging a carrier with the tray at the positioning station, transferring the tray and molded body by the carrier to a severing station, engaging holddown surfaces at the severing station with portions of the body adjacent the molded sections in alignment with the linear regions, and severing at the severing station the connecting regions supporting the molded sections by moving surfaces adjacent the linear regions to detach each of the molded sections from the tray.

7. The method according to claim 6 including the steps of conveying the discrete molded sections from the severing station, and retracting the tray carrier to the tray positioning station.

8. The method according to claim 7 including engaging the carrier with a succeeding tray bearing a molded body and advancing the succeeding tray to the severing station, and moving the empty tray away from the severing station under the influence of advancement of the carrier toward the severing station.

9. The method of processing a molded body of bonded mineral fibers wherein the body is configured with a plurality of molded sections connected by bridge regions adjacent linear supports of a tray including the steps of engaging a carrier with the tray bearing the molded body, transferring the tray and molded body by the carrier to a severing station, engaging hold-down surfaces with fibers at the linear supports, severing the connecting bridge regions adjacent the molded sections to detach the sections from the molded body, retracting the hold-down surfaces, retracting the carrier to a position to receive a succeeding tray, and moving the tray away from the severing station under the influence of movement of the carrier transferring a succeeding tray to the severing station.

10. The method of processing a molded body of resin-bonded fibers comprising a plurality of molded tile sections connected with bridges of fibers adjacent spaced linear supports of a tray mounting the molded body including the steps of delivering the tray bearing the molded body to a positioning station, engaging a carrier with the tray at the positioning station, transferring the tray and molded body by the carrier to a severing station, locking the tray at the severing station, engaging the fibers at the linear supports with hold-down surfaces, severing the bridges of fibers adjacent the linear supports to detach the molded tile sections one from another and from the body providing discrete tiles, retracting the hold-down surfaces, releasing the empty tray at the severing station, retracting the carrier to the positioning station to receive a succeeding tray, and moving the empty tray away from the severing station by the carrier advancing a succeeding tray to the severing station.

11. The method according to claim 10 including conveying the discrete tiles away from the severing station independently of the empty tray.

12. Apparatus for severing connected molded sections from a molded body of severable material mounted upon spaced linear supports of a tray for the molded sections of the body comprising, in combination, frame means, a head mounted by the frame means, severing devices mounted by said head for movement relative thereto, means associated with the frame means for positioning a tray bearing a molded body adjacent said head, and means for actuating said severing devices into engagement with the regions connecting the molded sections together and with the body adjacent the linear supports of the tray for severing the connecting regions to detach the molded sections from the body and from the linear supports.

13. Apparatus for severing connected molded tile sections from a molded body of bonded fibers mounted upon a carrier having spaced linear supports adjacent fiber bridges connected with the tile sections of the body comprising, in combination, frame means, a head mounted by the frame means, severing devices mounted by said head for movement relative thereto, means associated with the frame means for positioning a tray bearing a molded unit adjacent said head, means for locking the tray in position adjacent the head, means for actuating said severing devices into engagement with the bridges connected with the tile sections adjacent the linear supports of the tray for severing the bridges to detach the molded tile sections one from another and from the tray, said actuating means for the severing devices being operable to retract the severing devices after the completion of a severing operation, and means operable upon completion of a severing operation for releasing said tray locking means.

14. Apparatus for detaching molded sections from a molded body of severable material wherein the molded sections are provided with connecting bridges disposed adjacent spaced linear members of a supporting tray comprising, in combination, a severing station, relatively movable severing devices at the severing station, a relatively movable tray-transferring member, said transferring member adapted to receive a tray bearing a molded body, relatively movable abutment means for securing the tray to the transferring member, means for moving the member for transferring the tray carried thereby to the severing station, means for actuating the severing devices into engagement with the connecting bridges of the molded sections and adjacent the linear supports for severing the connecting bridges and thereby detach the molded sections from the body, said severing device actuating means being arranged to retract the severing devices after the molded sections have been severed and detached from the molded body.

15. Apparatus for detaching molded sections from a molded body of severable material wherein the molded sections are provided with connecting bridges engaged with spaced linear members of a supporting tray comprising, in combination, a severing station, a head at the severing station, relatively movable severing devices mounted by said head, a relatively movable tray-transferring carrier adapted to receive a tray bearing a molded body, relatively movable means for securing the tray to the carrier, actuating means for moving the carrier and the tray to the severing station, actuating means for moving the severing devices into engagement with the connecting bridges of the molded sections and adjacent the linear supports for severing the bridges and thereby detach the molded sections from the molded body, said severing devices being retractable after the molded sections have been severed from the molded body, and means for releasing the tray securing means to release the tray from the carrier.

16. Apparatus for severing connected molded sections from a molded unit of severable material mounted upon a tray having spaced linear supports for the sections comprising, in combination, frame means, a head mounted by the frame means, severing devices mounted by said head for movement relative thereto, means for actuating said head for movement relative to said frame means, guide means associated with the frame means for positioning a tray bearing a molded unit adjacent said head, means for locking the tray in position adjacent the head, plate members carried by said head and movable with said head into engagement with the molded material at the regions of the linear supports for the molded unit, actuating means for moving said severing devices into engagement with the regions of the molded material connected with the molded sections at the zones of the linear supports to sever and detach the molded sections from the molded unit, and means operable to retract the severing devices after completion of a severing operation, the actuating means for said head being operable to retract the head and disengage the plate members from the molded material on the linear supports of the tray.

17. The combination according to claim 16 wherein the means for actuating the head and the means for moving the severing devices into severing engagement with the material connected with the molded sections are operated by fluid pressure.

18. Apparatus for severing bridge portions connected with molded sections of a molded unit of severable material mounted upon a tray having spaced linear supports for the sections comprising, in combination, frame means, a head mounted by the frame means, severing devices mounted by said head for movement relative thereto, a reciprocable carrier mounted by the frame means adapted to receive a tray bearing a molded unit, actuating means for moving the carrier transferring the tray to a position adjacent said head, means for locking the tray in position adjacent the head, means for actuating said head for movement relative to said frame means, plate members carried by said head and movable with said head into engagement with the molded material at the regions of the linear supports on the tray, actuating means for moving said severing devices into engagement with the bridge portions connected with the molded sections at the zones of the linear supports to sever and detach the molded sections from the supports and the remaining waste material of the molded unit, and means operable to retract the severing devices after completion of a severing operation, the actuating means for said head being operable to retract the head and disengage the plate members from the molded material on the linear supports of the tray, the actuating means for the carrier being operable to retract the carrier to tray receiving position.

19. The combination according to claim 18 wherein the tray-transferring carrier is of yoke-like shape with spaced parallel leg portions, and relatively movable abutment means mounted by a leg portion engageable with a tray for securing the tray to the carrier during a tray-transferring movement of the carrier.

20. Apparatus for processing a molded body comprising a plurality of molded tile sections of compressed and bonded mineral fibers with fibrous bridge regions connected with the molded tile sections supported on spaced linear members of a tray comprising, in combination, frame means, a tray positioning station, a severing station, a relatively movable head mounted by the frame means at the severing station, a reciprocable carriage mounted by the frame means adapted to receive a tray bearing a molded body of tile sections, relatively movable abutment means mounted by the carriage engageable with the tray whereby the tray is movable with the carrier, actuating means for moving the carrier to transfer the tray to a position adjacent said head, means for locking the tray in position adjacent the head at the severing station, severing devices mounted by said head for movement relative thereto, means for actuating said head for movement relative to the tray, plate members carried by said head and movable therewith into engagement with the molded fibers at the regions of the linear supports on the tray, actuating means for moving said severing devices relative to said plate members into engagement with the fibrous bridge regions connected with the molded tile sections at the zones of the linear supports to sever the bridge regions and detach the molded tile sections from the supports and the remaining waste material of the molded body, means operable to retract the severing devices after completion of a severing operation, the actuating means for said head being operable to retract the head and the plate members, the actuating means for the carriage being operable to retract the carriage to the tray positioning station, conveyor means for conveying the detached tiles from the severing station, and second conveyor means for conveying the empty tray away from the severing station.

21. The combination according to claim 20 including a conveyor means for successively advancing trays bearing molded bodies to the tray positioning station.

* * * * *